United States Patent
Pillai et al.

(10) Patent No.: US 10,168,992 B1
(45) Date of Patent: Jan. 1, 2019

(54) INTERRUPTIBLE TRIGONOMETRIC OPERATIONS

(71) Applicant: TEXAS INSTRUMENTS INCORPORATED, Dallas, TX (US)

(72) Inventors: Prasanth Viswanathan Pillai, Karnataka (IN); Venkatesh Natarajan, Karnataka (IN); Alexander Tessarolo, Lindfield (AU)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/671,679

(22) Filed: Aug. 8, 2017

(51) Int. Cl.
*G06F 7/544* (2006.01)
*G06F 7/483* (2006.01)

(52) U.S. Cl.
CPC ............ *G06F 7/5446* (2013.01); *G06F 7/483* (2013.01)

(58) Field of Classification Search
CPC ................................. G06F 7/483; G06F 7/5446
USPC .................................................. 708/190, 276
See application file for complete search history.

(56) References Cited

U.S. PATENT DOCUMENTS

| | | | | |
|---|---|---|---|---|
| 6,434,582 B1* | 8/2002 | Choe | ..................... | G06F 7/5446 708/276 |
| 2002/0116181 A1* | 8/2002 | Khan | .................... | G06F 7/5446 704/205 |
| 2006/0106902 A1* | 5/2006 | Howard | ................. | G06F 17/16 708/200 |
| 2007/0074008 A1* | 3/2007 | Donofrio | ............... | G06F 7/483 712/222 |

* cited by examiner

*Primary Examiner* — Tan V Mai
(74) *Attorney, Agent, or Firm* — Kenneth Liu; Charles A. Brill; Frank D. Cimino

(57) ABSTRACT

Processor architectures and associated methods provide interruptible, instruction-based trigonometric function computation based on CORDIC iterations, receiving and outputting floating-point values (e.g., 64-bit). The architectures and methods can provide multiple CORDIC-like iterations in as little as a single CPU processing cycle to provide an overall faster execution of trigonometric operations while having zero additional overhead for service of time-critical interrupts. Post interrupt service, a CORDIC operation can be resumed from where it was interrupted.

22 Claims, 13 Drawing Sheets

INTERRUPTIBLE TRIGONOMETRIC OPERATIONS

TECHNICAL FIELD

This disclosure relates to electronic processing systems and methods. This disclosure particularly relates to architectures and instruction sets to support interruptible trigonometric operations.

BACKGROUND

Interruptibility is a characteristic of some processor-implemented computational methods to permit a computational task to be paused in order to devote processor resources to a task of higher priority, and/or to return a valid partial or approximate solution to a problem even when such methods are interrupted before they would otherwise end. Some such methods can converge on increasingly more precise solutions the longer they are permitted to run.

CORDIC (for COordinate Rotation DIgital Computer), also known as Voider's algorithm, was conceived in the late 1950s to enable digital computers to iteratively calculate trigonometric and hyperbolic functions, among others, using only addition, subtraction, bitshift, and table lookup operations. The original CORDIC methodology is defined for fixed-point numbers. CORDIC converges on results with increasing precision the more iterations it is run.

SUMMARY

In an example, an integrated circuit (IC) includes a general-purpose processing core and special-purpose processing circuitry, e.g., a floating point unit (FPU) capable of processing instructions to perform computational operations on floating-point values. The special-purpose processing circuitry includes trigonometric hardware to compute trigonometric functions using CORDIC operations. The trigonometric hardware includes pre-iteration circuitry that assigns one or more input values to a quadrant and tests for exception conditions, in response to a first processor instruction call. The pre-iteration circuitry may also convert input values in floating-point format to fixed-point format. The pre-iteration circuitry can, for example, perform these tasks, for example, in a single processor cycle. The trigonometric hardware further includes CORDIC circuitry that performs at least one CORDIC iteration on the input values to produce result values in response to a second processor instruction call. The CORDIC circuitry can, for example, perform the at least one CORDIC iteration in a single processor cycle. The trigonometric hardware further includes result generation circuitry that modifies the result values, or values based on the result values, based on one or more determinations made by the pre-iteration circuitry, in response to a third processor instruction call. The result generation circuitry can, for example, modify the result values or values based on the result values in a single processor cycle.

In another example, a method of computing trigonometric functions includes executing, with a processor, an interruptible iterative CORDIC operation to an intermediate result, wherein individual or multiple iterations of the CORDIC operation are performed using specialized hardware for computing CORDIC operations. The CORDIC operation is paused in response to receiving an interrupt. One or more other processor tasks are executed with the processor. The CORDIC operation can then be resumed from where it left off after the completion of the one or more other tasks.

In yet another example, a method of computing trigonometric functions includes executing, with a processor, an interruptible iterative CORDIC operation to an intermediate result, wherein individual or multiple iterations of the CORDIC operation are performed using specialized hardware for computing CORDIC operations. The CORDIC operation in response to receiving an interrupt. The intermediate result of the CORDIC operation is output.

DETAILED DESCRIPTION

Figure 1:
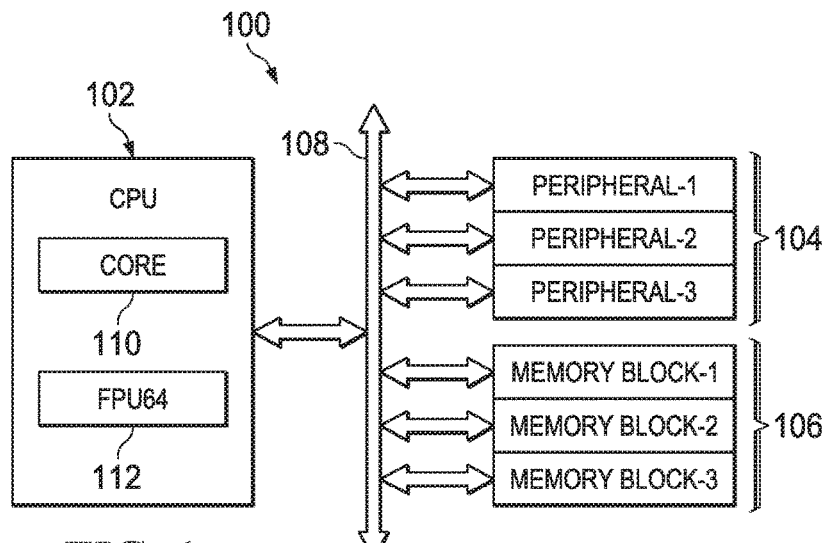
FIG. 1 is a block diagram of an example system on chip (SoC).

This application discloses systems and methods providing hardware implementation of instruction-based trigonometric function computation based on CORDIC iterations to provide a number of features and advantages, including the following. Whereas CORDIC is defined for fixed-point numbers, the systems and methods disclosed herein can receive and output floating-point values and can thus use the same pool of floating-point registers used by other floating-point hardware, such as a floating-point adder or a floating-point multiplier. The systems and methods can use high precision (e.g., 64-bit) look-up table coefficients and internal calculations for higher result precision (e.g., higher than single-precision). The systems and methods can provide computation of trigonometric operations with lower latency, predictability in computation time, and the ability to interrupt mid-CORDIC-computation for servicing of time-critical interrupts. The systems and methods can provide a compile-time choice of result accuracy versus trigonometric computation latency. The systems and methods can provide multiple CORDIC-like iterations in a single processing cycle to provide an overall faster execution of trigonometric operations. The systems and methods can provide a hardwired look-up table to enable a higher number of such iterations, because the hardwired look-up table will have faster access time compared to accessing from memory. The systems and methods can further have zero additional overhead for service of time-critical interrupts, i.e., the systems and methods can provide for CORDIC operations that are interruptible with no more interrupt latency than the smallest nonzero interrupt latency associated with any instruction executed by the general-purpose processing core. Post interrupt service, an operation can be resumed from where it was interrupted.

DSP/servo systems, such as those that perform Clarke and Park transforms in control operations or provide position estimation using a resolver, can require support for floating point trigonometric operations. Such systems are designed to receive sensed input signals, which may have been converted to digital signals by an analog-to-digital converter, process such signals using a microcontroller or other type of digital processor, and thereby provide useful control outputs to one or more peripheral devices connected to the microcontroller or other processor, for example, to control motors that aid machine movement.

To be real-time, such systems must be fast and deterministic, such that results of processed inputs are delivered to outputs within the amount of time permitted by the control loop in any given case. For example, a system running a fifty kilohertz control loop must be able to perform the entire sequence of control operations—sensing, computing, and providing output—within twenty microseconds, without violation, regardless of whatever else the computational resource may be tasked with. The time-critical nature of real-time systems, particularly those in which failure to timely meet the control loop timing requirements can have catastrophic implications for the system, makes interruptibility of computational operations and minimization of interrupt latency important features in such systems. Any aspect of a real-time system that delays an interrupt from getting serviced is detrimental from a system perspective.

In the digital control systems discussed herein, "latency" refers to the time interval (expressed, e.g., in microseconds, or as a number of CPU clock cycles) between the instant at which a digital controller initiates a call for data or a request to store data, and the instant at which delivery of the data is completed or the storage is started. In such systems, processing tasks may be interrupted to complete higher priority, more time-critical tasks. An interrupt signal can be generated and transmitted within a digital processor to pause or halt a lower priority task. "Interrupt latency" (aka "interrupt service latency") describes the time that elapses from when an interrupt is generated to when the source of the interrupt begins to be serviced.

As an example, a first processor component dedicated to a certain processing task (e.g., a multiplier for multiplication of floating-point numbers) may require three CPU cycles to complete its processing task. If an interrupt is received in the first of the three CPU cycles, the interrupt may not be able to be serviced until the multi-cycle task performed by the first component is completed and a number of additional CPU cycles are expended on housekeeping tasks. The interrupt latency in such case is thus as large as three cycles plus the number of housekeeping cycles. A second processor component, by contrast, may be configured to be interruptible every CPU cycle, such that the interrupt latency for the second component is never more than one cycle plus a number of housekeeping cycles. In a processor having both the first and second component, the smallest nonzero interrupt latency is said to be one cycle plus a number of housekeeping cycles. FIG. 1 is a block diagram of an example system on chip (SoC) 100 that includes a digital processor 102 implemented as an integrated circuit (IC). SoC 100 can, for example, be part of a larger control system that might also include, for example, actuators and/or servomotors. Processor 102 can be, for example, a modified C28 CPU. Processor 102 can read from and/or write to one or more peripheral devices 104 and/or memory blocks 106 over one or more buses 108. For example, a first peripheral device can be a sensor or other input device, such as an analog-to-digital converter, a resolver, or an encoder, while another peripheral might be an output device, such as a pulse-width modulator or a digital-to-analog convertor, to effectuate a control output determined by a computational result based on input from the first peripheral.

Processor 102 may be equipped with a core or other logic 110 for processing regular CPU instructions (relating, for example, to fixed-point numbers) as well as logic 112 for processing instructions relating to floating-point numbers, i.e., a "floating point unit" (FPU). Core 110 can issue instruction calls using instructions in an instruction set, including instructions performed by FPU 112. Each instruction controls processor 102 to perform a particular computational task. Floating-point processing logic 112 can be higher than single precision, e.g., double-precision (i.e., capable of processing 64-bit values), and may be intensive in terms of the amount of silicon area it requires on the integrated circuit 102, but the additional precision afforded by logic 112 can be exploited to provide more precise control in the control application to which SoC 100 is applied.

Figure 2:
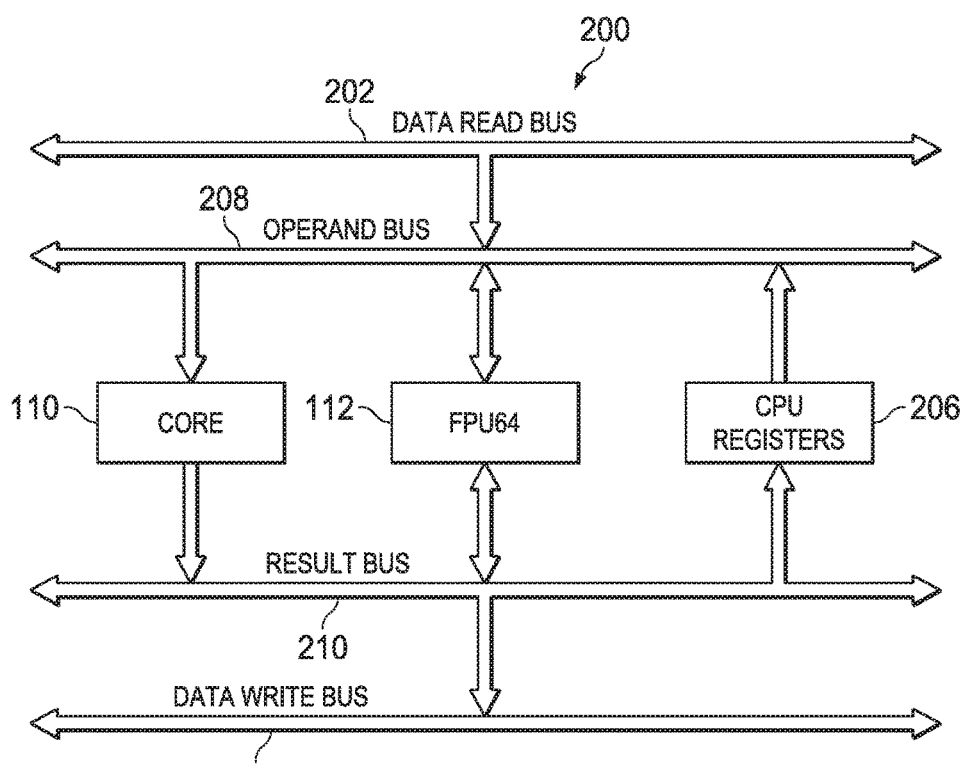
FIG. 2 is a block diagram of an example central processing unit (CPU).

FIG. 2 shows an example block diagram 200 of a portion of processor 102 from FIG. 1, in which buses 108 from FIG. 1 are shown as separate buses for data read 202 and data write 204. Floating-point processing logic 112, which can be double-precision, along with regular core 110, has access to a pool of general-purpose registers 206 in processor 102. An operand bus 208, local to the processor 102, is used to exchange data coming from the registers 206, peripherals 104, and/or memory 106, in the latter cases via data read bus 202, and logics 110, 112. Computation results from the logics 110, 112 can be placed on local result bus 210 for writing to registers 206 or for transmission via data write bus 204 to output peripherals and/or memory.

Figure 3:
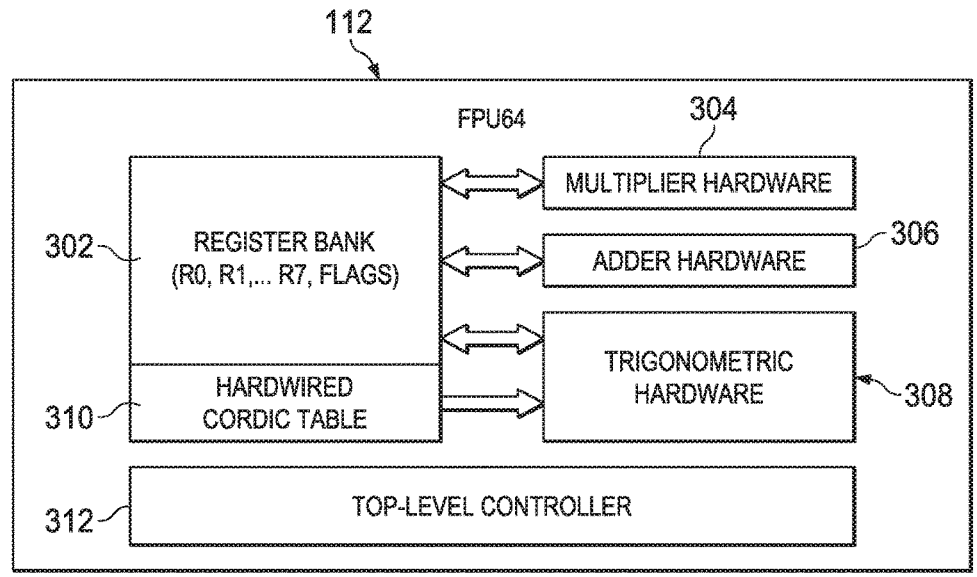
FIG. 3 is a block diagram of an example floating point unit having specialized hardware for computing trigonometric functions.

FIG. 3 shows an example block diagram of floating-point processing logic 112. Logic 112 can include a bank of eight storage registers 302 numbered from R0 to R7, each capable of storing digital values in a high-precision floating-point format, e.g., a double-precision floating-point format. Bank 302 may also include a number of single-bit flags. Logic 112 can further include multiplier hardware 304, adder hardware 306, and trigonometric hardware 308, each capable of accessing values stored in register bank 302. Additionally, logic 112 can include a hardwired lookup table 310 configured to provide CORDIC values to trigonometric hardware 308 faster than could be provided by accesses to memory 106. Top-level controller 312 can, for example, coordinate the read/write accesses of register bank 302 by processing hardware components 304, 306, 308 to ensure orderly operation and prevent collisions.

Trigonometric hardware 308 provides the capability to compute solutions to trigonometric functions using CORDIC methods and to make instructions for performing such computation appear to the larger system 100 as specialized processor instructions within the instruction set of processor 102. All trigonometric function computation functions can be executed through a sequence of instructions issued by processor 102 and allocated to floating point unit 112. Thus, just as an instruction call may be made to perform a floating point multiplication using multiplier hardware 304, a call made via a specialized CORDIC instruction can direct floating point unit 112 to perform part of a trigonometric calculation using trigonometric hardware 308. Because CORDIC functions can be executed like any other instructions in the processor's instruction set, and because the CORDIC computation functionality can be atomized according to associated special processor instructions, the solution of trigonometric functions can be interrupted at the same native interrupt latency supported by processor 102 with no additional interrupt latency overhead owing to trigonometric operations. The trigonometric computation hardware 308 can be partitioned so as to appear like a piece of hardware that can operate on the same pool of general-purpose registers 302 as directed by CORDIC processor instructions that appear to processor 102 as any other processor instructions and which are thus encoded and handled by the processor 102 just as any other instructions in its instruction set. Registers 302 can be greater in size than 32-bit, e.g., 64-bit.

Figure 4:
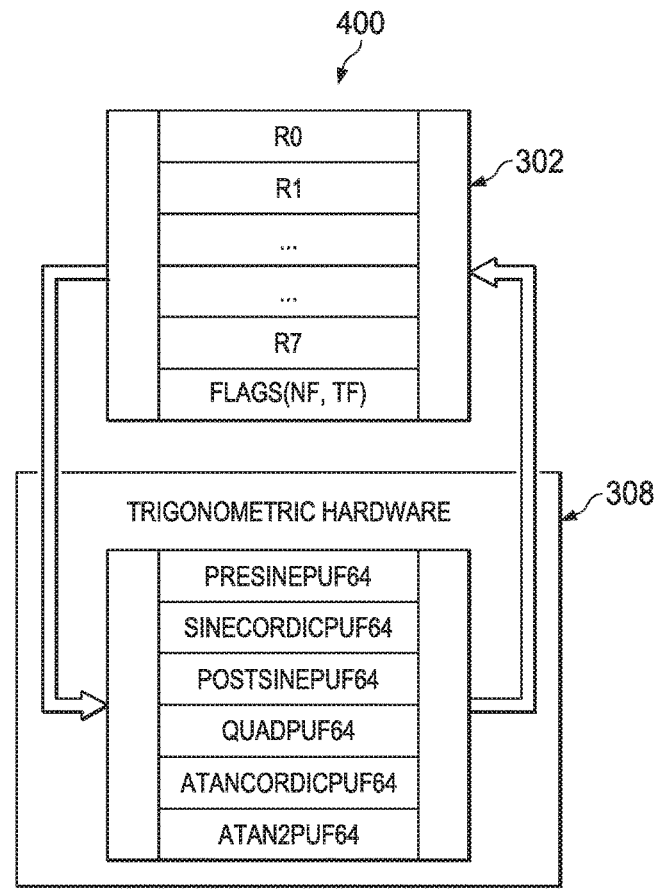
FIG. 4 is a diagram illustrating interaction between example trigonometric hardware and registers in an example floating point unit.

FIG. 4 is an example diagram illustrating the interaction between the trigonometric hardware 308 and the register bank 302 in the floating point unit 112. The trigonometric hardware 308 can contain dedicated hardware for performing each of the set of six hardware instructions listed. Three such instructions, PRESINEPUF64, SINECORDICPUF64, and POSTSINEPUF64, are associated with computing sine and cosine functions using CORDIC methods, while another three such instructions, QUADPUF64, ATAN CORDICPUF64, and ATAN 2PUF64, are associated with computing arctangent functions. With the aid of these two sets of instructions and their associated hardware, many other trigonometric functions can be efficiently computed, because many other functions are variants of sine, cosine, and arctangent. The hardware associated with the first three instructions provides sine and cosine results simultaneously.

The "PU" in each instruction name is indicative of use of a per-unit (PU) format for representation of angles as normalized to vary between zero and one, rather than as varying between zero and $2\pi$ radians. An angle in PU format can therefore be obtained by dividing the radian value of the angle by $2\pi$. Although the use of a PU format results in certain efficiencies, the hardware and methods described herein could be adapted to make use of other number formats as well.

The "F64" in each instruction name indicates that the respective hardware operates on 64-bit (i.e., double-precision) floating-point numbers. However, the hardware described herein could be adapted to be used with a variety of different precisions.

Figure 5:
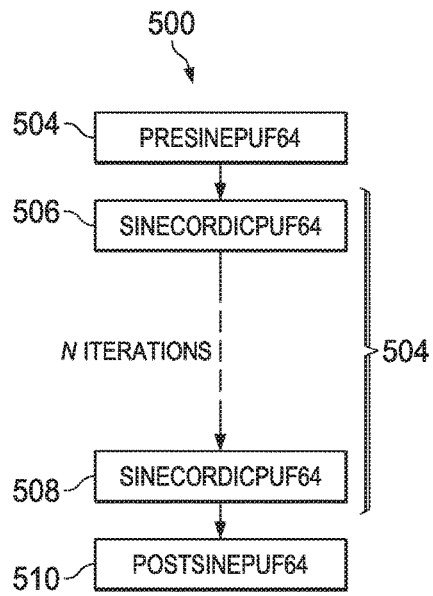
FIG. 5 is a flow diagram illustrating an example sequence of operations for computing sine and cosine.
Figure 6:
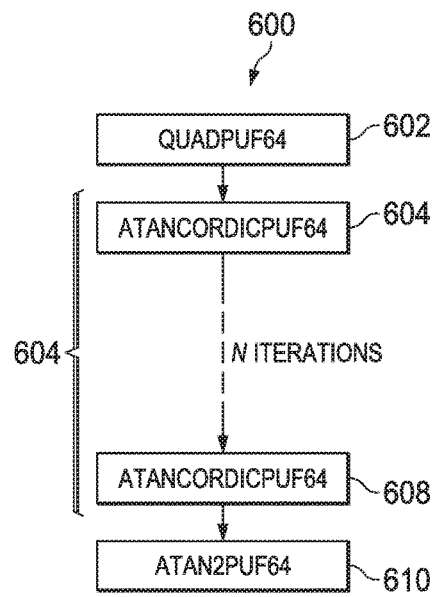
FIG. 6 is a flow diagram illustrating an example sequence of operations for computing a tan 2.

FIGS. 5 and 6 are flow diagrams illustrating example sequences of operations used to compute CORDIC trigonometric functions. FIG. 5 shows an example sequence 500 for computing sine and cosine outputs based on an input angle. An initial call to a PRESINEPUF64 instruction 502 controls hardware to perform preliminary computation. This preliminary computation 502 is followed a number of calls 504 to a SINECORDICPUF64 instruction 506. After N iterations of SINECORDICPUF64, ending in a final call 508, a POSTSINEPUF64 function call 510 is made to finalize outputs from the iterative CORDIC process 500.

Similarly, FIG. 6 shows a sequence 600 for computing the arctangent function based on coordinate inputs to arrive at an output angle. An initial call to a QUADPUF64 instruction 602 controls hardware to perform preliminary computation, in this case to determine the relevant quadrant of the unit circle of the input coordinates. This preliminary computation 602 is followed a number of calls 604 to an ATAN CORDICPUF64 instruction 606. After N iterations of ATAN CORDICPUF64, ending in a final call 608, an ATAN 2PUF64 function call 610 is made to finalize outputs from the iterative CORDIC process 600, in this case using quadrant information derived from the preliminary phase 602. Each call illustrated in FIGS. 5 and 6 can be performed in as little as a single processor cycle, such that, for N CORDIC iterations, a CORDIC computation can complete in N+2 processor cycles (one extra processor cycle for each of the pre-iteration 502, 602 and post-iteration 510, 610 phases).

Figure 7:
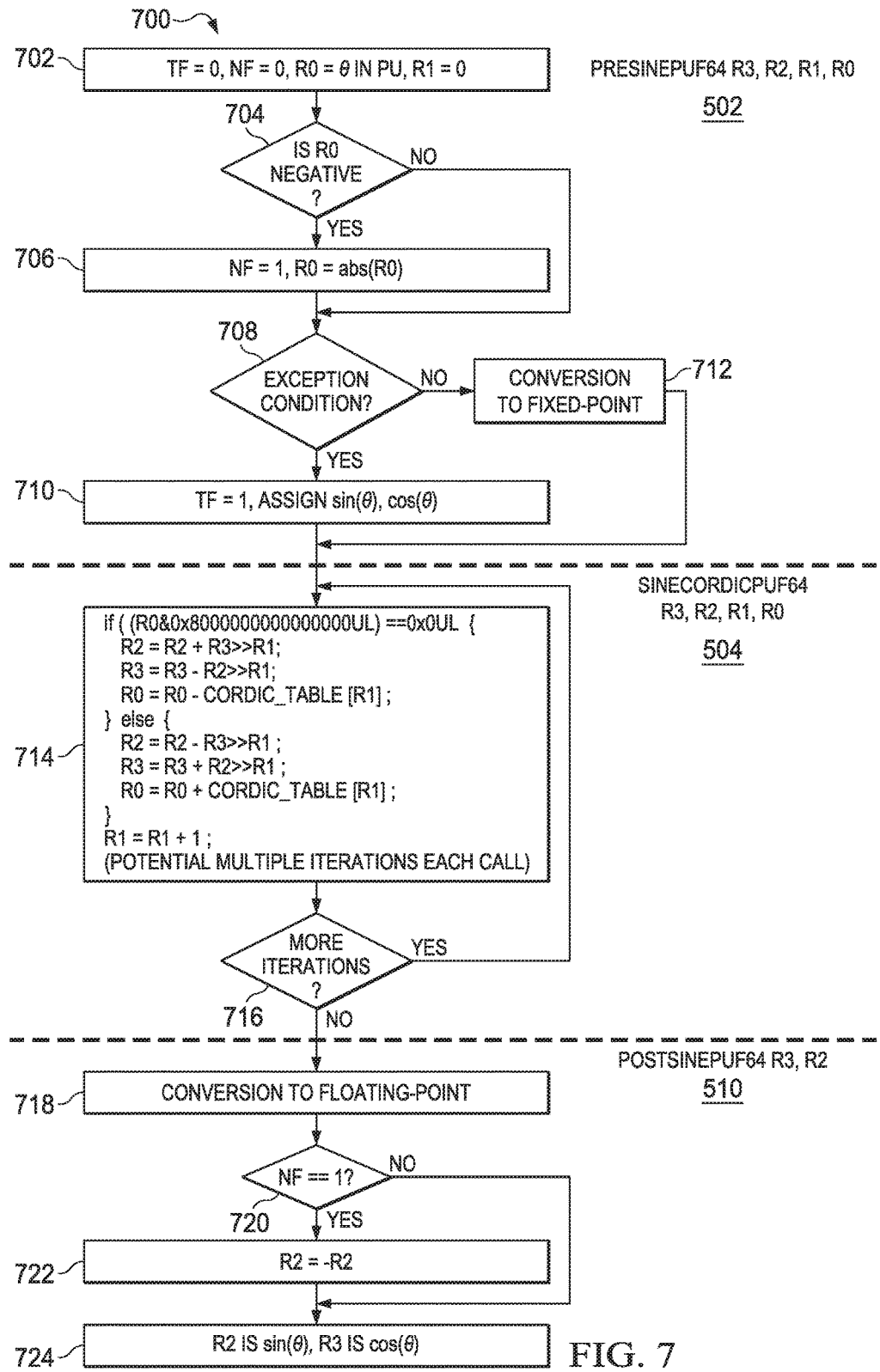
FIG. 7 is a flow diagram illustrating example functioning of trigonometric hardware to compute sine and cosine.

FIG. 7 is a flow diagram illustrating example functioning 700 of trigonometric hardware 308 (in FIGS. 3 and 4) to compute sine and cosine values for an input angle θ using PRESINEPUF64, SINECORDICPUF64, and POSTSINEPUF64 instructions and the associated hardware for each of these instructions. Thus, flow diagram 700 can correspond to the example sequence 500 given in FIG. 5. First, a pre-iteration phase 502, designated PRESINEPUF64, can detect a negative input angle 704 and exception conditions 708 and, in absence of such conditions, can modify 712 the floating-point numbers to fixed-point numbers to ease computation in a subsequent iteration phase 504.

Based on a detection 704 of a negative input angle, a negative flag (NF) can be set 706, and the angle can be set to its absolute value 706. Detected exception conditions can include the input angle θ being outside an allowed range of between $-2\pi$ and $2\pi$ radians, or the input angle θ being a very low value, e.g., less than $2^{-20}$, whereupon the sine of the input angle θ can be considered to be equal to the input angle θ, and the cosine of the input angle θ can be considered to be equal to one. If an exception condition is detected 708, then sine and cosine output values for input angle θ can be assigned directly by updating registers corresponding to sin(θ) and cos(θ) with appropriate assigned values, and by setting a status_flag, TF, to 1. The hardware 308 can check whether this particular flag is set so as to skip iteration phase 504 in the event of direct result assignment because of an exception condition.

The fixed-point numbers into which the floating-point numbers are converted 706 in the illustrated example 700 can be, for example, Q60 numbers. Q is a number format for representing signed fixed-point numbers where the number of fractional bits is specified. Thus, a Q60 number has sixty fractional bits and, e.g., three integer bits and one sign bit. The following listing provides pseudocode illustrating an example for such conversion. A digital logic translation of the pseudocode in Listing 1 may be used to implement the conversion in hardware.

LISTING 1: Number format conversion

```
temp_exp=(Ra.ui64 & 0x7FF0000000000000UL)>>52;
temp_mantissa=((Ra.ui64 & 0x000FFFFFFFFFFFFFUL)
    |0x0010000000000000UL)<<8;  // Left shifting to
    improve resolution
Ra.ui64=temp_mantissa;
Ra.i64=(Ra.i64>>(1023-temp_exp));
```

Next, CORDIC iterations can be performed in iteration phase 504, corresponding to one or more calls of the SINECORDICPUF64 instruction and using the associated hardware. The iterated CORDIC operations can achieve higher precision by using higher-precision internal tables (e.g., hardwired CORDIC table 310 in FIG. 3) and calculations, and can provide faster execution by providing, in hardware, multiple CORDIC-like iterations in a single processor cycle. Pseudocode 714 shown in flow diagram 700 provides a representation of example mathematical operations performed by the hardware associated with the SINECORDICPUF64 instruction. Decision 716 shows that as many iterations as specified can be performed. The number of desired iterations can be fixed, for example, at compile time. In some examples, the iterations can be paused in the event of an interrupt. After servicing a higher-priority interrupt service routine (ISR), the execution of CORDIC iterations can resume from where it paused. In some examples, the number of iterations may also be cut short by an interrupt signal.

Next, in a post-iteration phase 510, also called a result generation phase, a final CORDIC iteration result and input from exception detection can be used to generate an output result. For example, where the input to the CORDIC iteration phase 504 was first converted 712 into fixed-point values, the results output from the iteration phase 504 can be converted back 718 to floating-point format for storage 724 in respective registers in register bank 302 (in FIGS. 3 and 4). Conversion 718 is skipped when TF is set 710. Based on a detection that NF was set 720 (e.g., in 704/706), the sine output value can be negated 722. Both sine and cosine values of the input angle are computed and stored 724 using the illustrated CORDIC operation.

Figure 8:
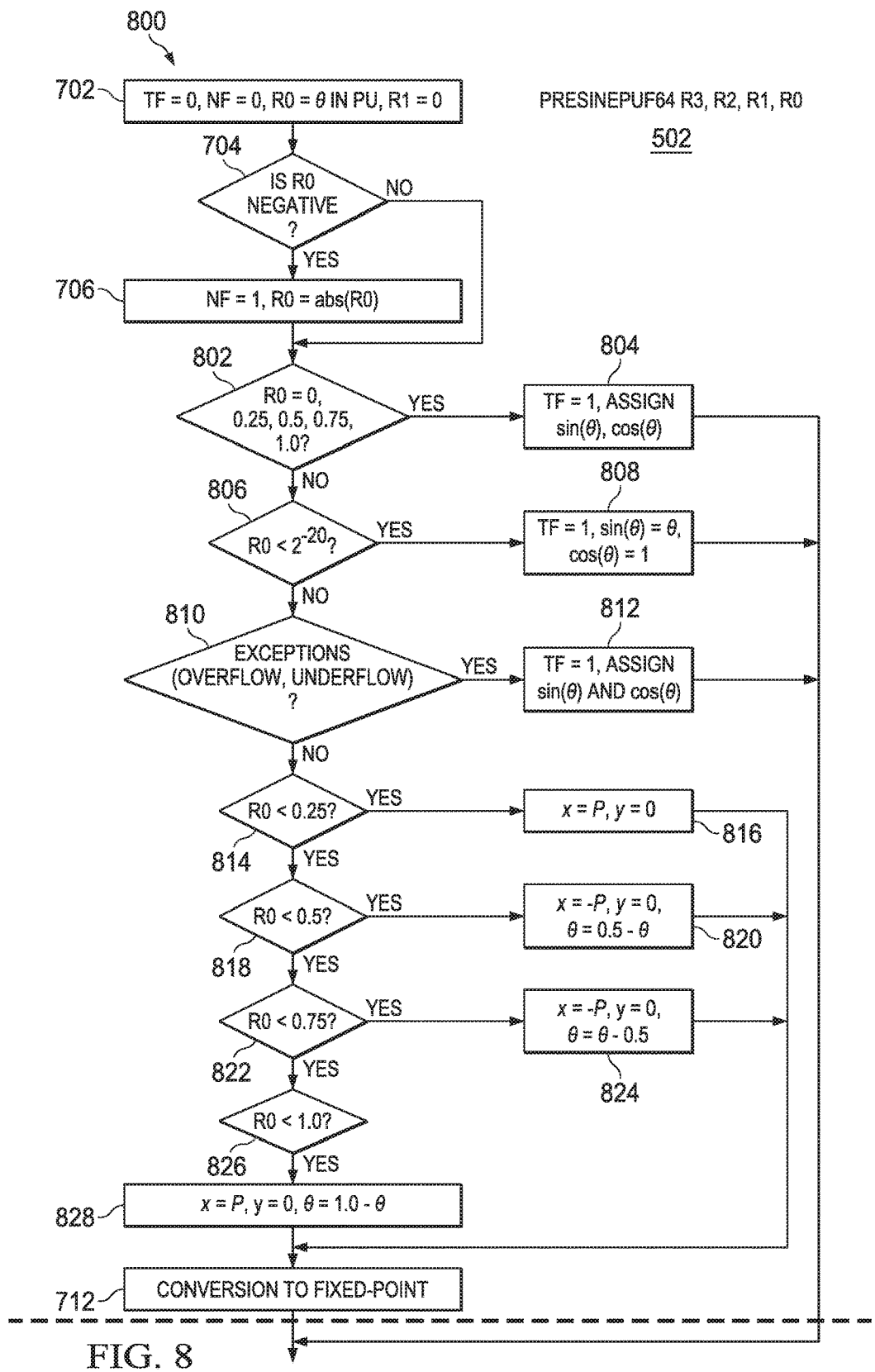
FIG. 8 is a flow diagram illustrating example functioning of trigonometric hardware for a sine/cosine computation pre-iteration phase.

FIG. 8 is a flow diagram 800 showing example functioning of the hardware associated with PRESINEPUF64 instruction 502 in further detail. Initialization 702 and input angle sign testing/flagging 704/706 in the example of FIG. 8 are the same as shown in FIG. 7, but exception condition testing 708 (from FIG. 7) and other variable initialization is shown more fully than in FIG. 7. If input angle θ, corresponding to the content of register R0, is one of five boundary values (0, 0.25, 0.5, 0.75, or 1.0 in PU format), 802, then the output values are assigned directly 804, the flag TF is set, and the iteration phase 504 is skipped. Similarly, if the input angle is too small 806, the sine, cosine outputs are assigned as (θ, 1), 808, the TF flag is set, and the iteration phase 504 is skipped. The input can also be checked 810 for exception conditions such as overflow or underflow, and TF as well as one or more other flags can be set 808 and the sine and cosine outputs can be assigned 808 based on an exception condition being indicated. For example, if the input angle is more than 1 (in PU format), overflow flag LVF can be set, and the outputs can be assigned as (0, 1). When TF is set, the floating-point-to-fixed-point conversion 712 and the iteration phase 504 (in FIG. 7) can be bypassed.

Otherwise, the input angle θ is within range for CORDIC computation and, prior to conversion to fixed-point format 712 and iteration phase 504, x and y values are initialized and the angle θ is adjusted to be moved to the first quadrant if it is not already there in a quadrant assignment procedure corresponding to reference numerals 814-828. This quadrant assignment is illustrated and discussed further with respect to FIG. 15. Still referring to FIG. 8, when R0 is less than 0.25 in PU format, 814, but still not too small for CORDIC computation, x is set to the CORDIC constant P and y is set to zero, 816. When R0 is greater than 0.25 but less than 0.5, 818, x is set to the negative of the CORDIC constant P, y is set to zero, and θ is set to 0.5-θ, 820. When R0 is greater than 0.5 but less than 0.75, 822, x is set to the negative of the CORDIC constant P, y is set to zero, and θ is set to θ-0.5, 824. When R0 is greater than 0.75 but less than 1.0, 826, x is set to the CORDIC constant P, y is set to zero, and θ is set to 1.0-θ, 828.

Figure 9:
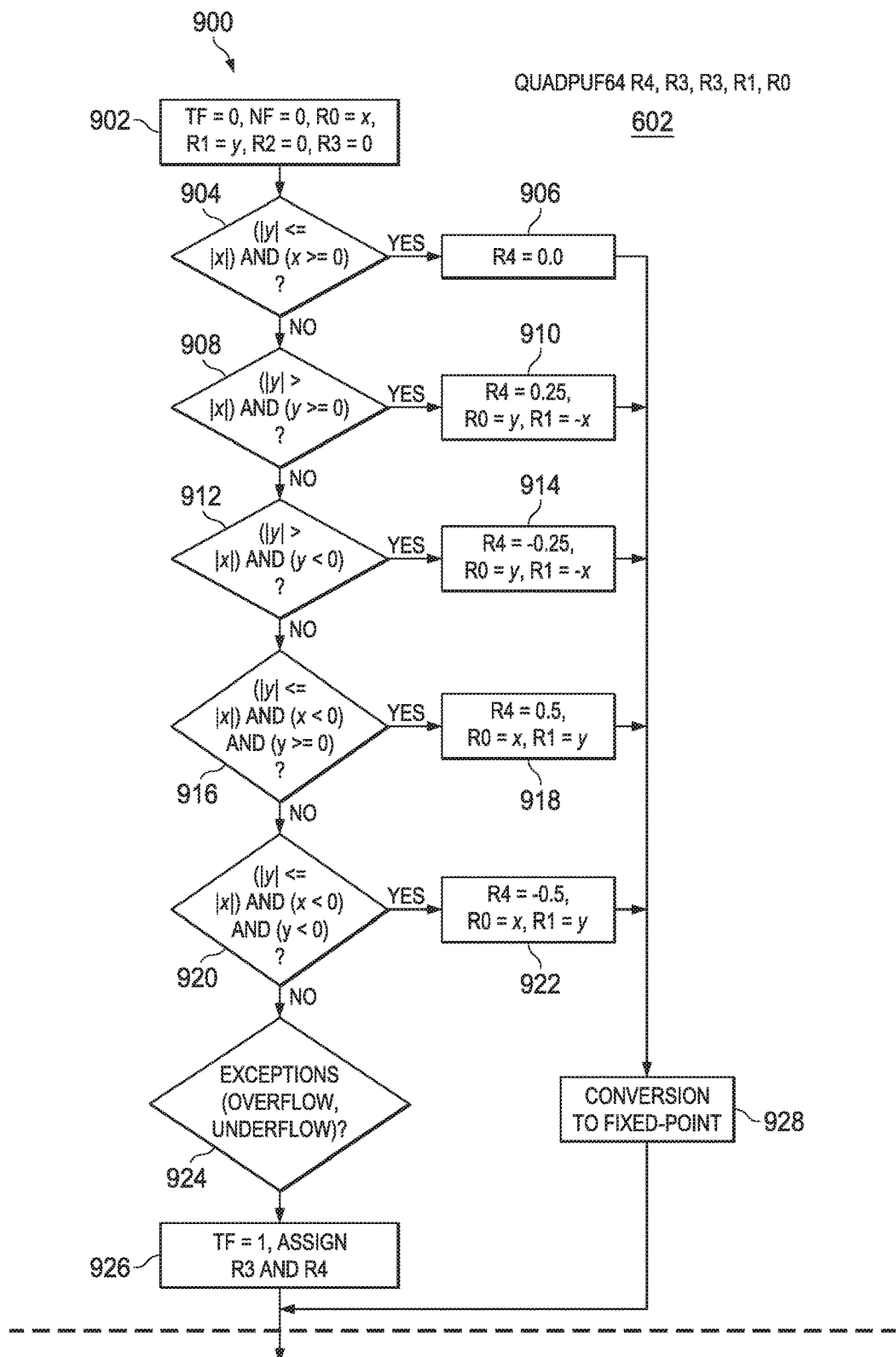
FIG. 9 is a flow diagram illustrating example functioning of trigonometric hardware for an a tan 2 computation pre-iteration phase.
Figure 16:
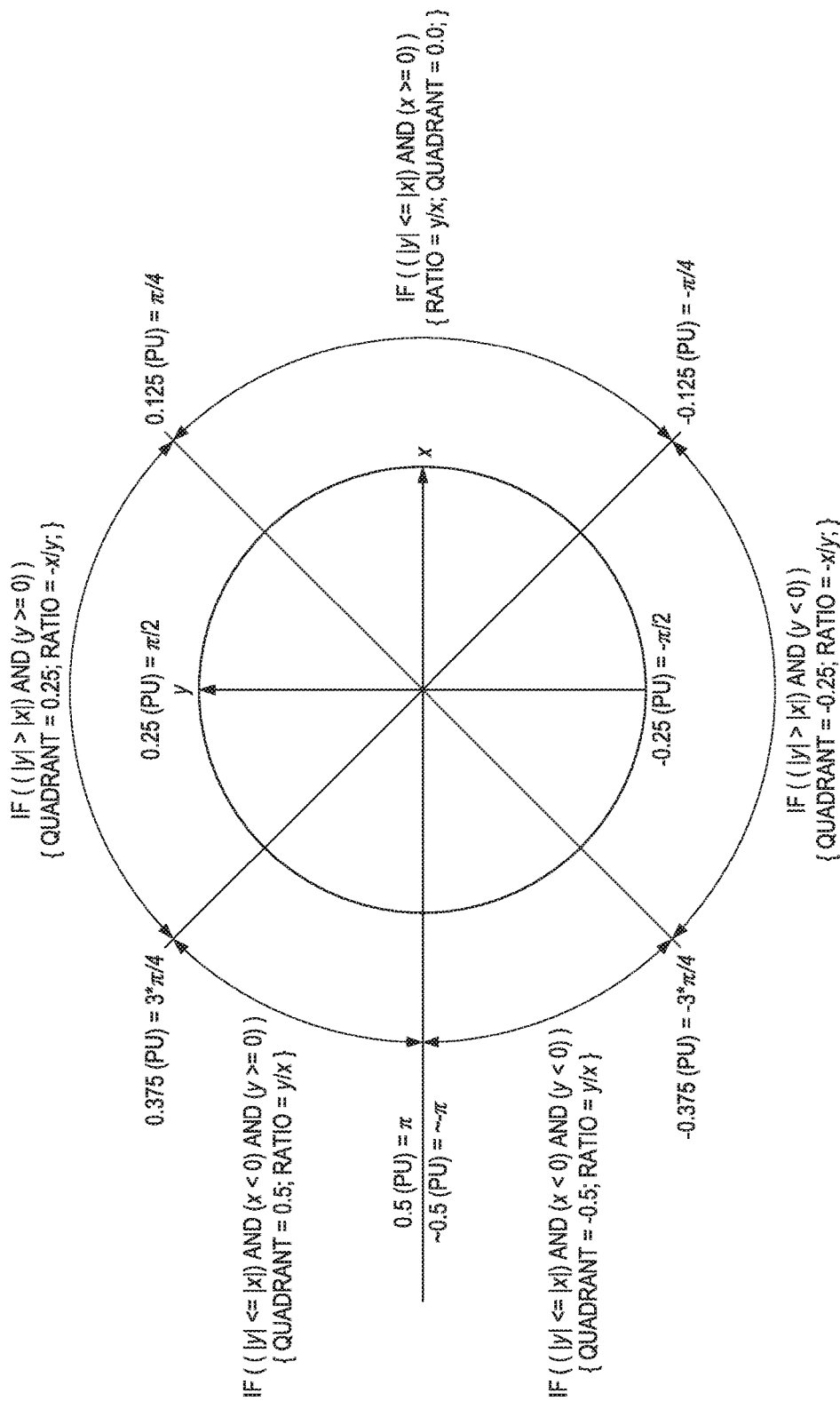
FIG. 16 is a diagram of a tan 2 quadrant assignment.

FIG. 9 is a flow diagram 900 showing example functioning of a call to the QUADPUF64 instruction, which is the pre-iteration phase 602 in an arctangent computation, in detail. Initializations 902 reset flags TF and NF to zero, assign input coordinates x and y to registers R0 and R1, respectively, reset the iteration count in register R2 to zero, and reset the value of register R3, storing the output angle θ, to zero. Register R4 stores a value corresponding to one of five "quadrants" (as shown in FIG. 16), as assigned depending upon conditions 904, 908, 912, 916, and 920.

If x is positive (or zero) and is greater in magnitude than or equal in magnitude to y, 904, then the input point (x, y) can be said to be in the right quadrant, and R4 is assigned 906 a value of zero. Else, if y is positive (or zero) and is greater in magnitude than x, 908, then the input point (x, y) can be said to be in the top quadrant, and R4 is assigned 910 a value of 0.25. R0 is set to y and R1 is set to –x. Else, if y is negative and is greater in magnitude than x, 912, then the input point (x, y) can be said to be in the bottom quadrant, and R4 is assigned 914 a value of –0.25. R0 is set to y and R1 is set to –x. Else, if y is positive (or zero) and x is negative and is greater in magnitude than or equal in magnitude to y, 916, then the input point (x, y) can be said to be in the upper-left quadrant, and R4 is assigned 918 a value of 0.5. R0 is set to x and R1 is set to y. Else, if both x and y are negative and x is greater in magnitude than or equal in magnitude to y, 920, then the input point (x, y) can be said to be in the lower-left quadrant, and R4 is assigned 922 a value of –0.5. R0 is set to x and R1 is set to y. If exceptions are met, such as overflow or underflow, 924, then the TF flag is set, 926, output values R3 and R4 are assigned, and floating-point-to-fixed-point conversion 928 and CORDIC iteration phase 604 (in FIG. 10) can be skipped. In absence of such exceptions, input values can be converted to fixed-point 928.

Figure 10:
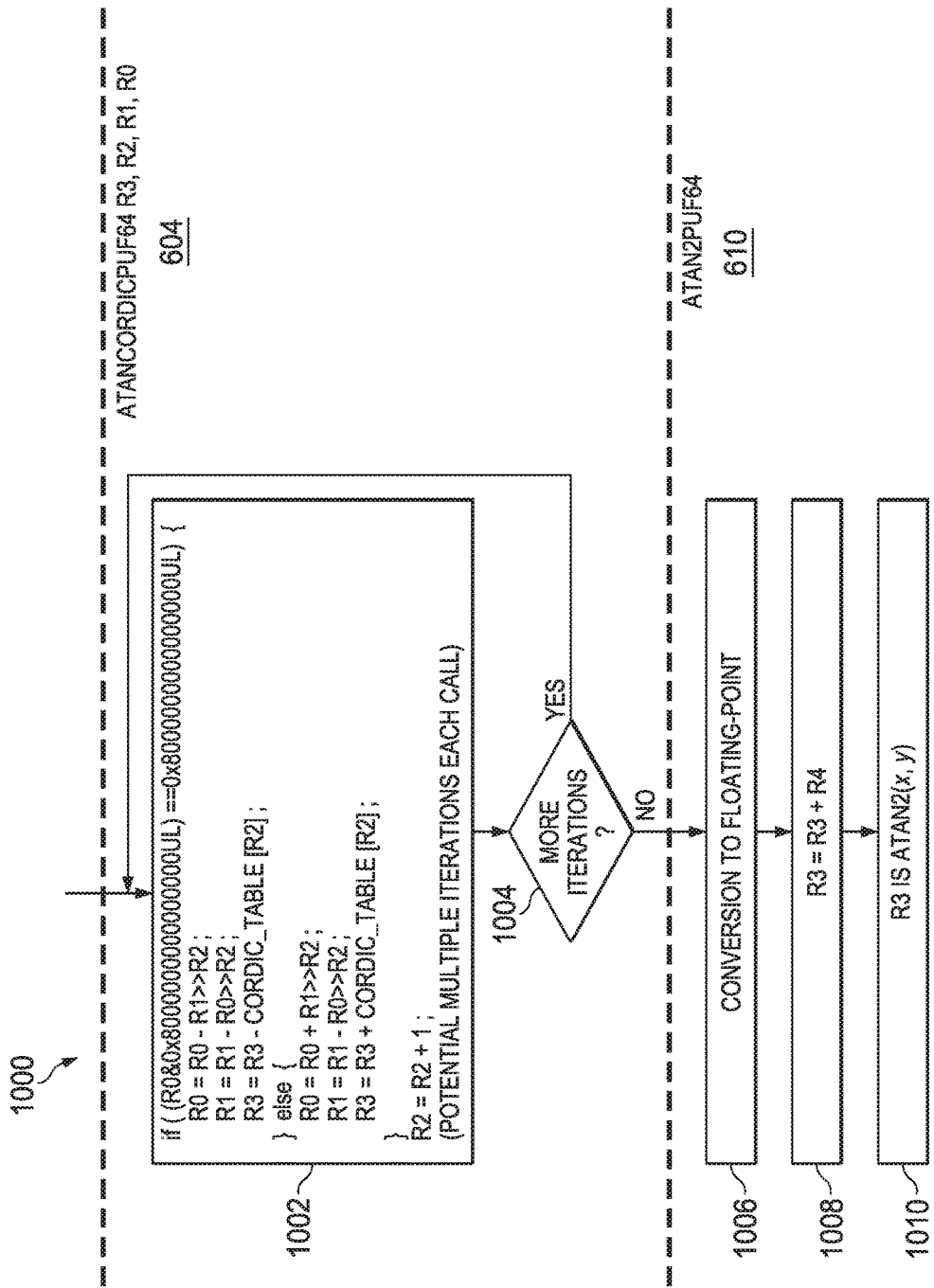
FIG. 10 is a flow diagram illustrating example functioning of trigonometric hardware for a tan 2 computation iteration and post-iteration phases.

Continuing from FIG. 9, FIG. 10 provides a flow diagram 1000 illustrating an example of the arctangent computation iteration phase 604 and post-iteration (i.e., result generation) phase 610 corresponding to the ATAN CORDICPUF64 and ATAN 2PUF64 instructions, respectively. CORDIC iterations can be performed in iteration phase 604, corresponding to one or more calls of the ATAN CORDICPUF64 instruction and using the associated hardware. The iterated CORDIC operations can achieve higher precision by using higher-precision internal tables (e.g., hardwired CORDIC table 310 in FIG. 3) and calculations, and can provide faster execution by providing, in hardware, multiple CORDIC-like iterations in a single processor cycle. Pseudocode 1002 shown in flow diagram 1000 provides a representation of the mathematical operations performed by the hardware associated with the ATAN CORDICPUF64 instruction. Decision 1004 shows that as many iterations as specified can be performed. The desired number of iterations can be fixed at compile time, for example. In some examples, the iterations can be paused in the event of an interrupt. After servicing a higher-priority ISR, the execution of CORDIC iterations can resume from where it paused. In some examples, the number of iterations may also be cut short by an interrupt signal.

Next, in a post-iteration phase 610, the result output from the iteration phase 604 can be converted back 1006 to floating-point format, can be added 1008 to the quadrant value derived in the pre-iteration phase 602 that was stored in register R4, and can be stored 1010 in register R3 in register bank 302 (in FIGS. 3 and 4). Conversion 1006 is skipped when TF is set 926 (in FIG. 9).

Figure 11:
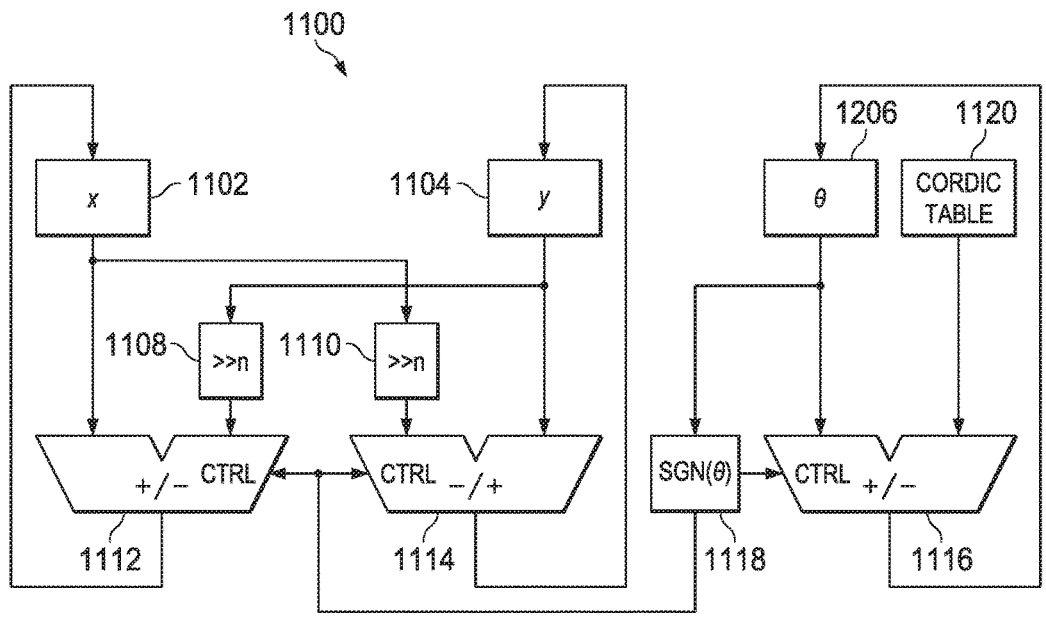
FIG. 11 is a block diagram of example hardware for a CORDIC implementation in a feedback arrangement.

FIG. 11 shows an example block diagram 1100 of hardware for a CORDIC implementation in a feedback arrangement permitting for an arbitrary number of iterations n. Registers 1102, 1104, 1106 store coordinate values x, y and angle value θ, respectively. The y and x values are fed through shifters 1108, 1110, respectively, and all three values are fed through add/subtract units 1112, 1114, 1116, respectively. Shifters 1108, 1110 perform a logical right shift, a bitwise operation that shifts the bits of the input operand by a specified number of bit positions, here designated as n, representative of the iteration performed. Thus, for a single-iteration implementation, n=1. Sign extractor 1118 determines the sign of angle θ as a control input to add/subtract units 1112, 1114, 1116 to add or subtract their two input operands depending on the value of respective control input CTRL. Thus, if θ is positive, x is incremented by y shifted right by n, y is decremented by x shifted right by n, and θ is decremented by a value in look-up table 1120 associated with iteration n, whereas if θ is negative, x is decremented by y shifted right by n, y is incremented by x shifted right by n, and θ is incremented by a value in look-up table 1120 associated with iteration n. In either case, after these operations, n is incremented by 1. With an increasing number of iterations, the arrangement 1100 hones in on the values of the output variables (either x and y or θ, depending on the operation performed) to an increasing level of precision.

Figure 12:
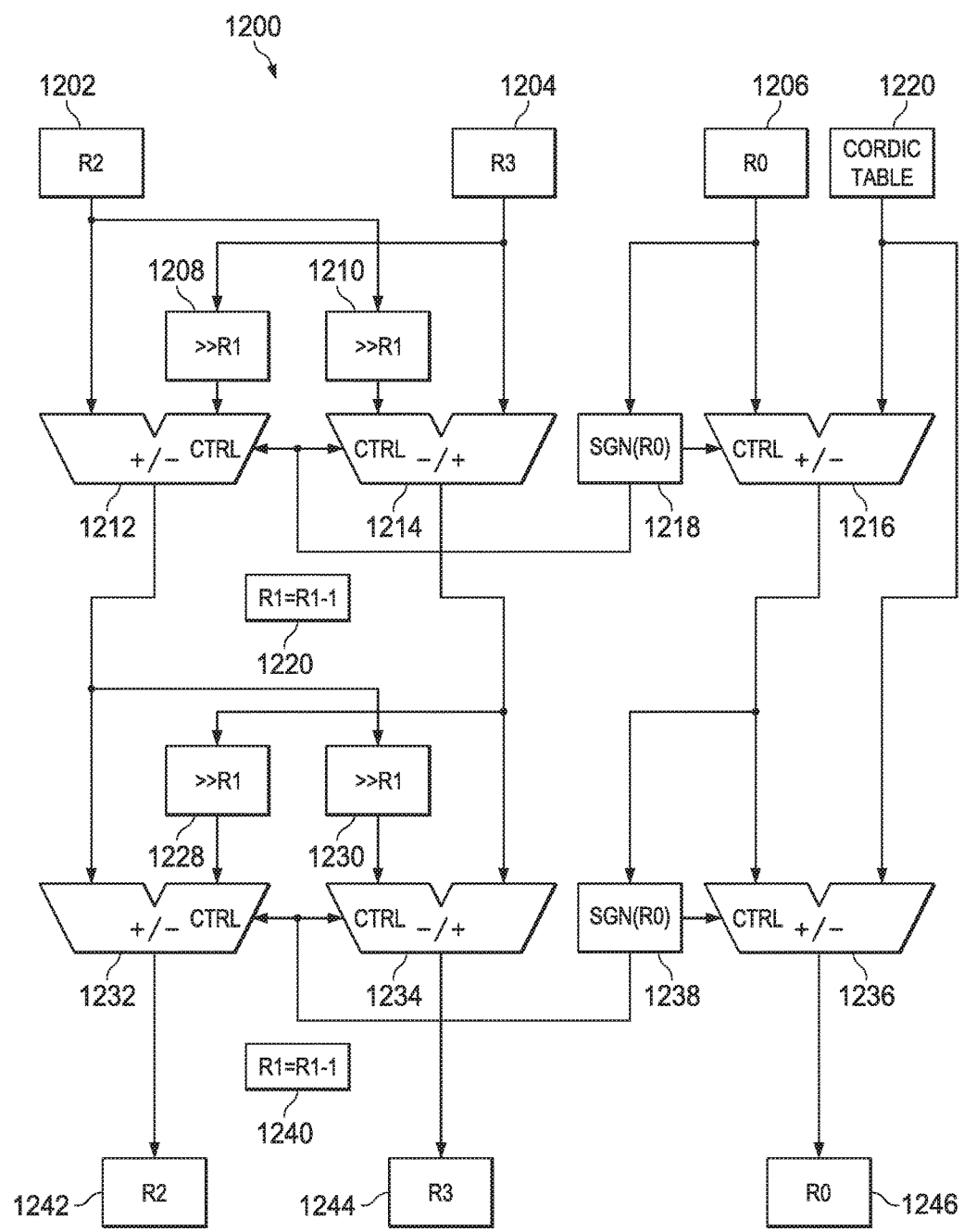
FIG. 12 is a block diagram of example hardware for a CORDIC implementation in a 2-stage arrangement.

Look-up table 1120 in FIG. 11 can correspond to table 310 in FIG. 3 and can be hardwired to improve speed. The table value corresponding to each entry may be given by a $\tan(\frac{1}{2}^i)/2\pi$, where the division by $2\pi$ represents the conversion to PU format. An example CORDIC table is given in the following listing:

LISTING 2: CORDIC table
{0X0040000000000000UL,
 0X0025C80A3B3BE610UL,
0X0013F670B6BDC73DUL,
 0X000A2223A83BBB34UL,
0X0005161A861CB136UL,
 0X00028BAFC2B208C5UL,
0X000145EC3CB8504CUL,
 0X0000A2F8AA23A885UL,
0X0000517CA68DA186UL,
 0X0000281BE5D766156UL,
0X0000145F30012374UL, 0X00000A2F98295019UL,
0X00000517CC19BFD8UL,
 0X0000028BE60D82E5UL,
0X00000145F306D5D2UL, 0X000000A2F9836D74UL,
0X000000517CC1B70BUL,
 0X00000028BE60DB90UL,
0X000000145F306DC9UL, 0X0000000A2F9836E4UL,
0X0000000517CC11B72UL,
 0X000000028BE60DB9UL,
0X0000000145F306DCUL, 0X00000000A2F9836EUL,
0X00000000517CC1B7UL, 0X0000000028BE60DBUL,
0X00000000145F306DUL, 0X000000000A2F9836UL,
0X000000000517CC1BUL, 0X00000000028BE60DUL,
0X0000000000145F306UL, 0X0000000000A2F983UL,
0X0000000000517CC1UL, 0X000000000028BE60UL,
0X0000000000145F30UL, 0X00000000000A2F98UL,
0X00000000000517CCUL, 0X0000000000028BE6UL,
0X00000000000145F3UL, 0X000000000000A2F9UL,
0X000000000000517CUL, 0X00000000000028BEUL,
0X0000000000000145FUL, 0X0000000000000A2FUL,
0X0000000000000517UL, 0X000000000000028BUL,
0X0000000000000145UL, 0X00000000000000A2UL, 0X0000000000000051UL, 0X0000000000000028UL,
0X0000000000000014UL, 0X000000000000000AUL};

FIG. 12 illustrates an example block diagram 1200 of hardware for a CORDIC implementation in a two-stage, non-feedback arrangement permitting for two iterations to be performed in a single clock cycle, for example. In the illustrated example 1200, coordinate x is stored in register R2 1202, coordinate y is stored in register R3 1204, and angle θ is stored in register R0 1206, these registers being those of register bank 302 (in FIGS. 3 and 4). As illustrated, register R1 stores the number of iterations n. In the first stage, the values in R3 1204 and R2 1202 are fed through shifters 1208, 1210, respectively, and the values in R2 1202, R3 1204, and R0 1206 are fed through add/subtract units 1212, 1214, 1216, respectively. Sign extractor 1218 determines the sign of R0 as a control input to add/subtract units 1212, 1214, 1216. This first stage thus operates in the same way as one iteration of the arrangement 1100 in FIG. 11, with the number of iterations being accounted for by incrementer 1220, which increments the iteration number stored in register R1. The results are passed on to a second, identical stage, in which the incremented or decremented R3 is fed through shifter 1228, the incremented or decremented R2 is fed through shifter 1230, and the incremented or decrement R2, the incremented or decremented R3, and the incremented or decremented R0 are fed through add/subtract units 1232, 1234, and 1236, respectively. Sign extractor 1238 determines the sign of the incremented or decremented R0 as a control input to add/subtract units 1232, 1234, 1236. The outputs of add/subtract units 1232, 1234, 1236 can then be re-stored in registers R2, R3, and R0 as new values 1242, 1244, 1246, respectively. Incrementer 1240 increments the iteration number stored in register R1. The pseudocode in Listing 3, below, describes an example of the 2-iteration operation of arrangement 1200.

Figure 13:
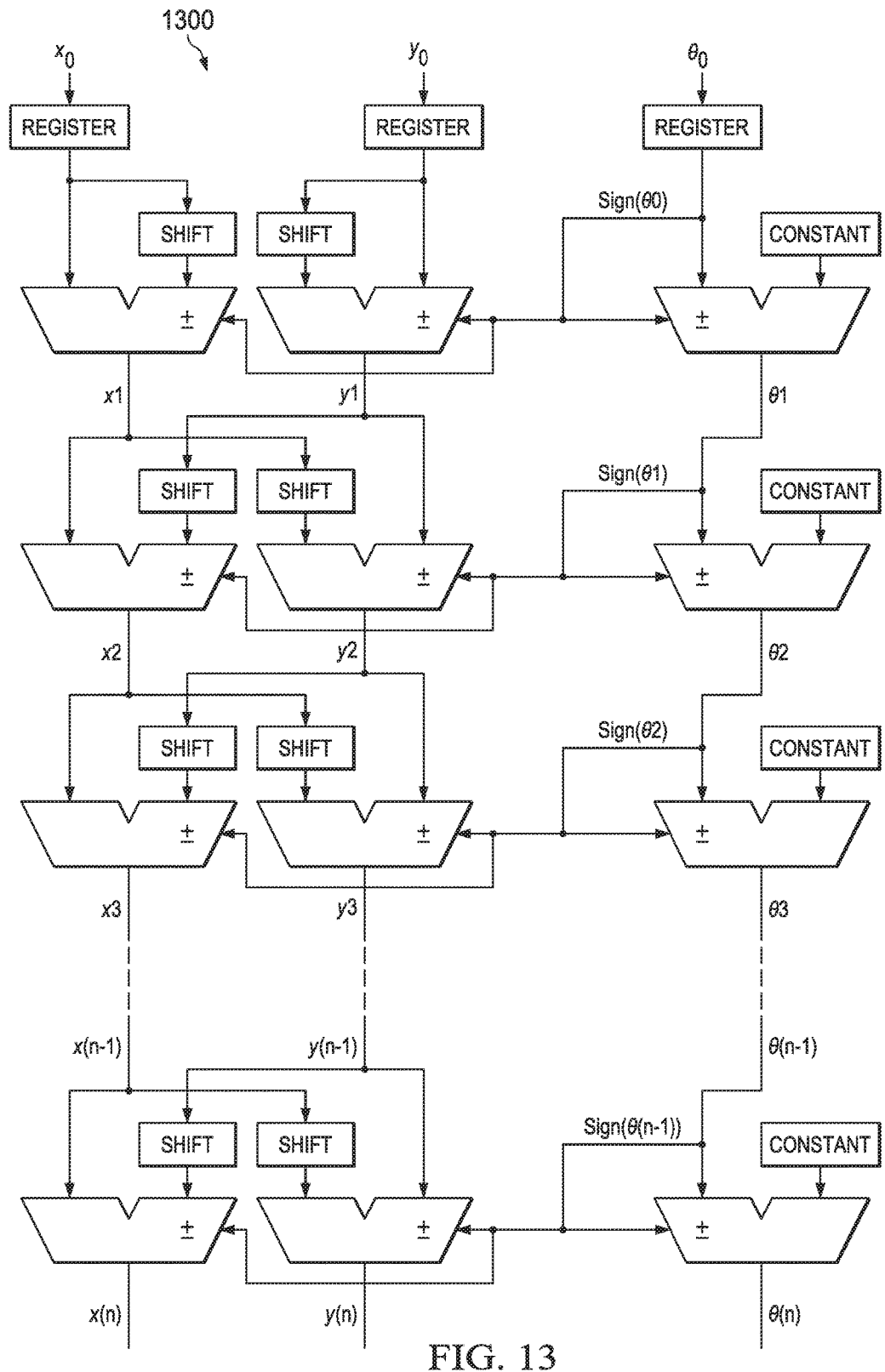
FIG. 13 is a block diagram of example hardware for a CORDIC implementation in a multiple-stage arrangement.

LISTING 3: 2-Iteration CORDIC
Iteration 1
if (R0 is positive) {
  R2=R2+R3>>R1;
  R3=R3-R2>>R1;
  R0=R0-CORDIC_TABLE[R1];
} else {
  R2=R2-R3>>R1;
  R3=R3+R2>>R1;
  R0=R0+CORDIC_TABLE[R1];
}
R1=R1+1;
Iteration 2
if (R0 is positive) {
  R2=R2+R3>>R1;
  R3=R3-R2>>R1;
  R0=R0-CORDIC_TABLE[R1];
} else {
  R2=R2-R3>>R1;
  R3=R3+R2>>R1;
  R0=R0+CORDIC_TABLE[R1];
}
R1=R1+1;

FIG. 13 illustrates an example block diagram 1300 of hardware for a CORDIC implementation in an n-stage, non-feedback arrangement permitting for an arbitrary n number iterations to be performed in a single clock cycle, for example. This arrangement functions similar to the arrangements 1100 and 1200 in FIGS. 11 and 12, as described above.

In view of the examples 1100, 1200, 1300, depending on its configuration, the hardware associated with the SINE- CORDICPUF64 and ATAN CORDICPUF64 instructions can perform one, two, three, or more CORDIC iterations with each call of the instruction, i.e., with each CPU clock cycle. The ability to perform multiple CORDIC iterations in a single CPU clock cycle increases the speed and efficiency of the trigonometric function computational ability of the processor 102. The precise number of stages chosen to be implemented in trigonometric hardware 308 may depend on the intended or maximum clock speed of processor 102 (e.g., 600 MHz, 500 MHz, 200 MHz, 100 MHz, etc.), the desired precision and/or limits on precision imposed by the register sizes (measured in bits), the chip area allotted to trigonometric hardware 308, the microcontroller or CPU fabrication technology (e.g., 65 nm, 45 nm, 28 nm, etc.), and potentially other factors.

Because practical implementations of examples 800, 900, and 1000 will have some finite signal propagation time delay between components, processor clock speed can limit the number of iterations that can be performed per cycle. The higher the clock speed, the less time there is for multiple-CORDIC-stage hardware to complete its computations. As an example, in 65-nanometer technology, while it may be possible to safely perform three or four CORDIC iterations per clock cycle at CPU clock frequencies of 100 MHz, for example, it may be possible to compute only two iterations per cycle at 200 MHz because the higher clock speed leaves only five nanoseconds for signals to propagate through the multiple-stage CORDIC hardware illustrated in FIG. 9.

Therefore, in some examples, it may be desired that only one CORDIC iteration is performed per CPU clock cycle, and thus only one stage may be implemented. This stage would resemble arrangement 1100 in FIG. 11, but without feedback. In other examples, it may be desired that two CORDIC iterations are performed per CPU clock cycle, and thus the two-stage hardware arrangement 1200 of FIG. 12 may be implemented. In other examples, many more stages (e.g., fifty-four) may be implemented. Whether performed in a single SINECORDICPUF64 call or spread out over multiple calls to SINECORDICPUF64, fifty-four total CORDIC iterations suffice to achieve maximum precision in values with a 53-bit mantissa. Therefore, in examples configured with two stages to complete two CORDIC iterations per cycle, as in FIG. 9, about twenty-seven iterative calls to SINECORDICPUF64 suffice to compute output to the full precision afforded by the double-precision floating point registers in bank 302. In examples with numerous stages, the computation of SINECORDICPUF64 may span multiple cycles which cannot be interrupted. Such an implementation reduces the benefit of interruptibility by (a) reducing the ability to interrupt a CORDIC computation in mid-precision and (b) reducing the ability to tradeoff precision for trigonometric computation latency.

In other examples that provide different sets of CORDIC computation hardware of a variety of numbers of stages in a single processor, the number of CORDIC iterations per cycle can be configured as a variable option, for example, by providing different iteration-phase instructions to respectively use different-stage-number CORDIC hardware. Although such implementations may require greater chip area for trigonometric hardware 308, greater flexibility is afforded to run processes at a variety of clock speeds. Alternatively or in addition, greater or fewer calls to SINECORDICPUF64 can be made to adjust outputs to the desired precision, trading off precision for execution time.

Figure 14:
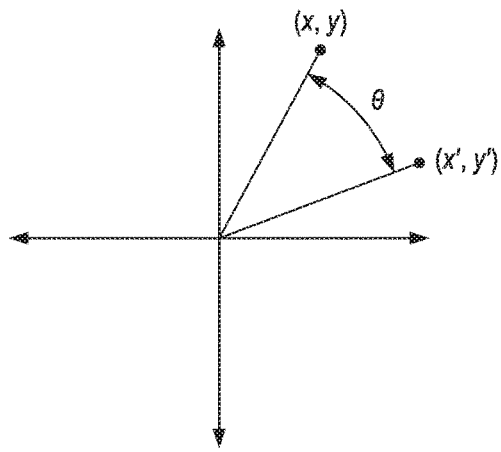
FIG. 14 is a plot of a rotated point.

The below discussion provides additional explanation for the functioning of the CORDIC implementations illustrated in FIGS. 11-13. As shown in the diagram of FIG. 14, when rotated by angle $\theta$, a point $(x, y)$ becomes new point $(x', y')$, which can be obtained as:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} = \cos\theta \begin{bmatrix} 1 & -\tan\theta \\ \tan\theta & 1 \end{bmatrix} \begin{bmatrix} x \\ y \end{bmatrix}.$$

Similarly, for a series of m rotations having angles $\theta_1, \theta_2, \ldots \theta_m$, $$\begin{bmatrix} x_m \\ y_m \end{bmatrix} = \prod_{i=0}^{m} \cos\theta_i * \prod_{i=0}^{m} \begin{bmatrix} 1 & -\tan\theta_i \\ \tan\theta_i & 1 \end{bmatrix} \begin{bmatrix} x \\ y \end{bmatrix}.$$

Calculations can be modified to speed computation of the above equation. As examples, the angles $\theta_i$ can be chosen such that $\tan\theta_i = 2^{-i}$, converting multiplication to shift operations. The sign of $\theta_i$ depends on the rotation angle, $\sigma_i$, which can be set as +1 or −1 depending on the direction of rotation. The observation of the symmetry of the cosine function further permits the simplification of the above equation as follows:

$$\cos(-\theta) = \cos\theta \Rightarrow \prod_{i=1}^{m} \cos\theta_i = K_i$$

(a constant), thus $$\begin{bmatrix} x_m \\ y_m \end{bmatrix} = \prod_{i=0}^{m} \cos\theta_i * \prod_{i=0}^{m} \begin{bmatrix} 1 & -\tan\theta_i \\ \tan\theta_i & 1 \end{bmatrix} \begin{bmatrix} x \\ y \end{bmatrix} =$$

$$K_i * \prod_{i=0}^{m} \begin{bmatrix} 1 & -\sigma * 2^{-i} \\ \sigma * 2^{-i} & 1 \end{bmatrix} \begin{bmatrix} x \\ y \end{bmatrix}.$$

When evaluating the sine or cosine functions using CORDIC, as in the examples of FIGS. 8-10, the iterations can start with $$\begin{bmatrix} x \\ y \end{bmatrix} = \begin{bmatrix} 1 \\ 0 \end{bmatrix}.$$

A final multiplication operation in the result-generation phase can be avoided by scaling this start point. Instead of starting with (1, 0) as given above, (P, 0) can be chosen as the iteration start point, where P is the CORDIC constant to which $K_i$ converges for increasing iterations i. For example, P can be chosen as $0.60725293500888 \times 2^{59}$+an accuracy adjustment term=0x04DBA76D421AF318UL. Whatever the start point, the corresponding point can then be rotated such that the final angle approaches input angle $\theta$. The finally obtained point $$\begin{bmatrix} x' \\ y' \end{bmatrix} = \begin{bmatrix} \cos\theta \\ \sin\theta \end{bmatrix}.$$

Thus, for any given input angle θ, the CORDIC implementation described above computes both the cosine and the sine simultaneously.

To use CORDIC to compute the a tan 2 function, which is the arctangent function with two arguments x and y not both equal to zero, the iterations start with the given (x, y) coordinates mapped to the first quadrant. The given point is rotated such that the y coordinate approaches zero. The total rotated angle, i.e., output angle θ, gives a tan 2 for the input point (x, y).

In order to compute a trigonometric function using the systems and methods described herein, the trigonometric function can be broken down into atomic operations each with instructions each executing in a single CPU cycle and having a compile-time choice of number of CORDIC iterations. The systems and methods thereby enable interruptibility with zero additional interrupt service latency, as well as a compile-time choice for the tradeoff between accuracy and trigonometric computation latency. The systems and methods can provide a CORDIC implementation with modified operations to permit floating point implementation. This means that intermediate operations can be carried out with higher precision to yield higher-precision results. As opposed to calling for a single CORDIC iteration per processor cycle, the systems and methods can employ a multiple-stage CORDIC implementation to perform multiple iterations per CPU cycle to speed up the computation. A hardwired look-up table can be used to enable faster execution versus a memory based look-up table. The systems and methods described herein can modify the trigonometric functions to operate in per-unit (PU) format. A final multiplication operation in the result-generation phase can be avoided by scaling the start point.

Figure 15:
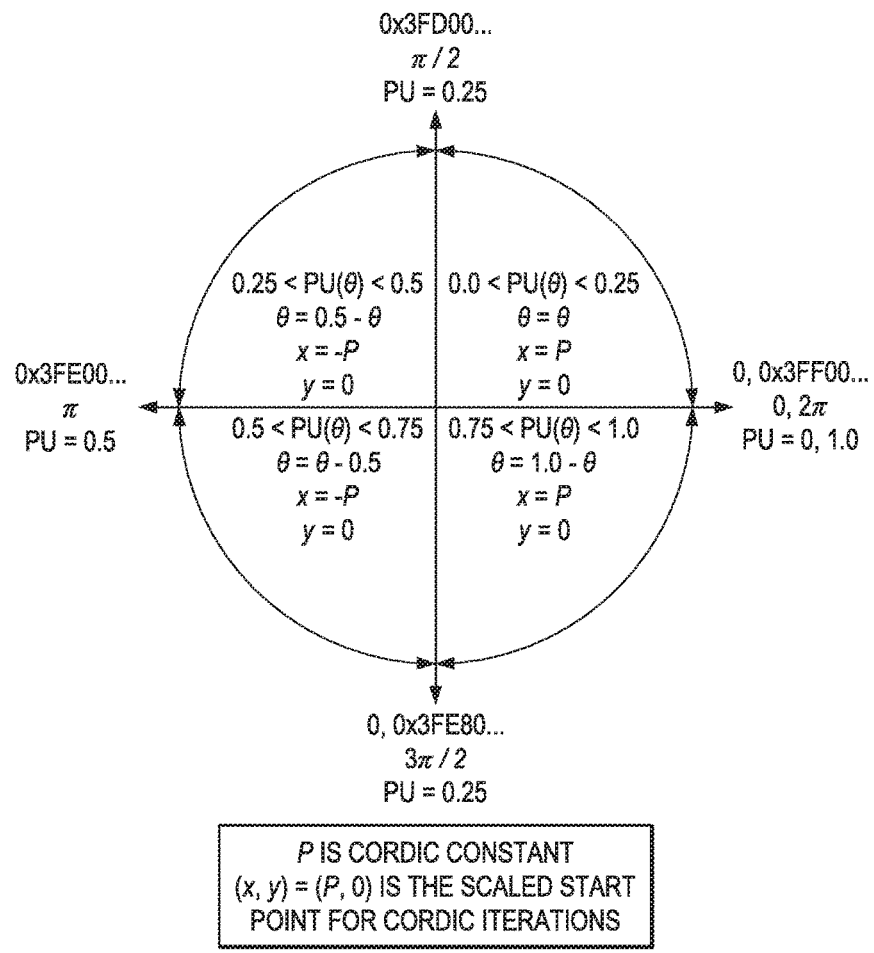
FIG. 15 is a diagram of sine/cosine quadrant assignment.

FIG. 15 illustrates an example sine/cosine quadrant assignment as can be used in the systems and methods disclosed herein. The input angle can be mapped to the first quadrant using the following trigonometric identities: $\sin(-\theta)=-\sin(\theta)$, $\sin(\pi-\theta)=\sin(\theta)$, $\cos(-\theta)=\cos(\theta)$, and $\cos(\pi-\theta)=-\cos(\theta)$. P is the CORDIC constant such that (x, y)=(P, 0) is the scaled start point for CORDIC iterations. One or more flags required for modification of the final result due to this first-quadrant mapping in the pre-iteration phase can be saved and used in the post-iteration phase to obtain the correct sign.

Hardware corresponding to the instruction PRESINEPUF64 R3, R2, R1, R0 can provide conditioning of the input operands R0, R1, R2, and R3 to enable CORDIC iteration. R0 represents angle θ in PU format. R1 is the iteration count for the CORDIC implementation. R2 represents the x values from the CORDIC iterations (i.e., sine in the result-generation phase). R3 represents the y values from the CORDIC iterations (i.e., cosine in result-generation phase). Thus, PRESINEPUF64 R3, R2, R1, R0 moves the angle θ to the first quadrant using the trigonometric identities of sin (π/2+θ), sin (π+θ), and sin (3π/2+θ)). Negative Flag (NF) is a processor status flag indicating a negative operand. Overflow flag LVF indicates a value of θ that is more than one full rotation. Test Flag (TF) is a general-purpose processor status flag, which, in the below example Listing 4, is used to indicate exception conditions.

LISTING 4: PRESINEPUF64 R3, R2, R1, R0
R1=0;
if (exception) {// NaN, Inf, very large or small numbers
// Set appropriate sine/cosine values
STATUS_FLAG.TF=1;
} if (R0.f64<=0.25) {// Quadrant assignment
R2.ui64=0x0000000000000000UL;
R3.ui64=0x04DBA76D421AF318UL; // CORDIC constant
} else if (R0.f64<0.5) {
R0.f64=0.50f−R0.f64;
R2.ui64=0x0000000000000000UL;
R3.ui64=0XFB245892BDE50CE8UL; // 2's complement STATUS_FLAG.NF=!(STATUS_FLAG.NF);
} else if (R0.f64<0.75) {
R0.f64=R0.f64−0.5f;
R2.ui64=0x0000000000000000UL;
R3.ui64=0XFB245892BDE50CE8UL;
} else if (R0.f64<=1) {
R0.f64=(1.0f)−R0.f64;
R2.ui64=0x0000000000000000UL;
R3.ui64=0x04DBA76D421AF318UL;
STATUS_FLAG.NF=!(STATUS_FLAG.NF);
}

The instruction SINECORDICPUF64 R3, R2, R1, R0 can be iterated in an n-iteration loop to provide the CORDIC iterations for sine and cosine calculation. Hardware corresponding to this instruction can perform the example operations in the below Listing 5, where the input operands R0, R1, R2, and R3 are as described above.

LISTING 5: SINECORDICPUF64 R3, R2, R1, R0
if ((R0&0x8000000000000000UL)==0x0UL) {
R2=R2+R3>>R1;
R3=R3−R2>>R1;
R0=R0−CORDIC_TABLE[R1];
} else {
R2=R2−R3>>R1;
R3=R3+R2>>R1;
R0=R0+CORDIC_TABLE[R1];
}
R1=R1+1;

The instruction POSTSINEPUF64 R3, R2 can be used to perform result assignment. Hardware corresponding to this instruction can perform the operations in the below example Listing 6 to convert integer result values (e.g., in Q60 format) back to to double-precision floating point values.

LISTING 6: POSTSINEPUF64 R3, R2
R2=Q_to_Float(R2) // sine(θ)
R3=Q_to_Float(R3) // cosine(θ)

FIG. 16 illustrates an example a tan 2 quadrant assignment corresponding to the functioning of the hardware associated with the QUADPUF64 instruction as illustrated in the flow diagram 900 of FIG. 9. Referring to FIG. 16, a point at the (x, y) input coordinates for a tan 2 computation can reside in any of the four quadrants. Hardware corresponding to an instruction herein named QUADPUF64 R4, R3, R2, R1, R0 can be used to map the input coordinates to fall in the [−π/4, π4] radian range as indicated in FIG. 16 and save the residual value for computing a tan 2 in the result-generation phase. The mapped coordinates can then be used for the CORDIC iterations and for obtaining the result angle. Following the performance of CORDIC iterations, as with the ATAN CORDICPUF R3, R2, R1, R0 instruction shown in the below example Listing 7, the angle thus obtained can then be mapped back to a respective quadrant using the information stored from the pre-iteration phase, as shown in the below example Listing 8 for ATAN PUF64 R3, R4. In the below Listings 7 and 8, R0 is the x coordinate, R1 is the y coordinate, R2 is the iteration count of the CORDIC implementation, R3 is the θ value of the current iteration, and R4 stores a value corresponding to the quadrant.

LISTING 7: ATAN CORDICPUF64 R3, R2, R1, R0
if ((R1&0x8000000000000000UL)== 0x8000000000000000UL) {

```
R0=R0-R1>>R2; // Arithmetic shift
R1=R1+R0>>R2;
R3=R3-CORDIC_TABLE[R2];
} else {
    R0=R0+R1>>R2; // Arithmetic shift
    R1=R1-R0>>R2;
    R3=R3-CORDIC_TABLE[R2];
}
R2=R2+1;
LISTING 8: ATAN 2PUF64 R3, R4
R3=R3+R4; // Adding the bias from QUADPUF64
R3=Q_to_Float(R3); // Converting Q back to float
```

Figure 17:
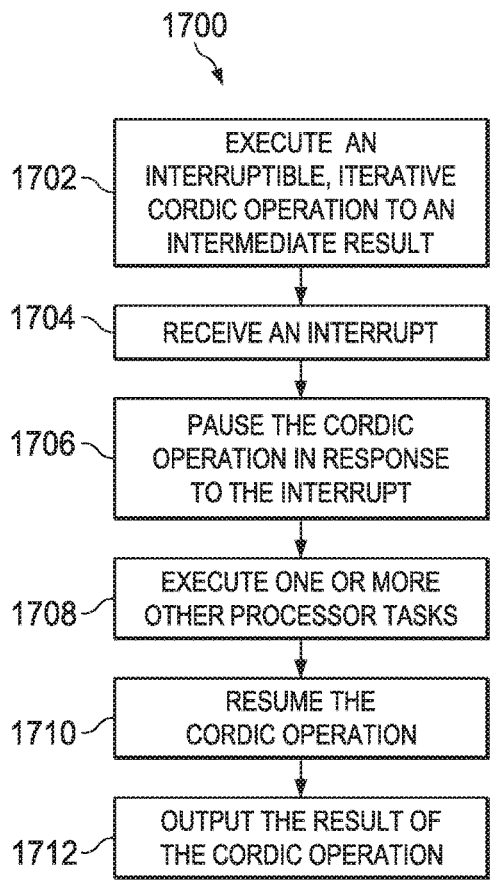
FIG. 17-19 are flow charts illustrating example methods of computing a trigonometric function.

FIG. 17 is a flow diagram illustrating an example method 1700 for interruptible iterative CORDIC computation of, for example, trigonometric functions, using a digital processor, such as processor 102 in FIG. 1, having specialized hardware for performing CORDIC computations. Method 1700 begins with the execution 1702 of an interruptible iterative CORDIC operation to an intermediate result. An interrupt is received 1704, causing the CORDIC operation to pause 1706 in response to the interrupt. At this time, the intermediate result is stored. One or more other processor tasks, e.g., one or more higher-priority interrupt service routines (ISRs), can be executed 1708 prior to resumption of the CORDIC operation 1710 to completion, whereupon the CORDIC result can be output 1712, e.g., for use in a control system. In the illustrated example, completion can be defined, for example, as a desired number of iterations to reach a required result precision, which can be fixed at compile time. The interruptibility of the CORDIC operation permits the processor performing the method the flexibility to switch to and complete a higher-priority processing task within the time allowed by a predefined control loop frequency.

Figure 18:
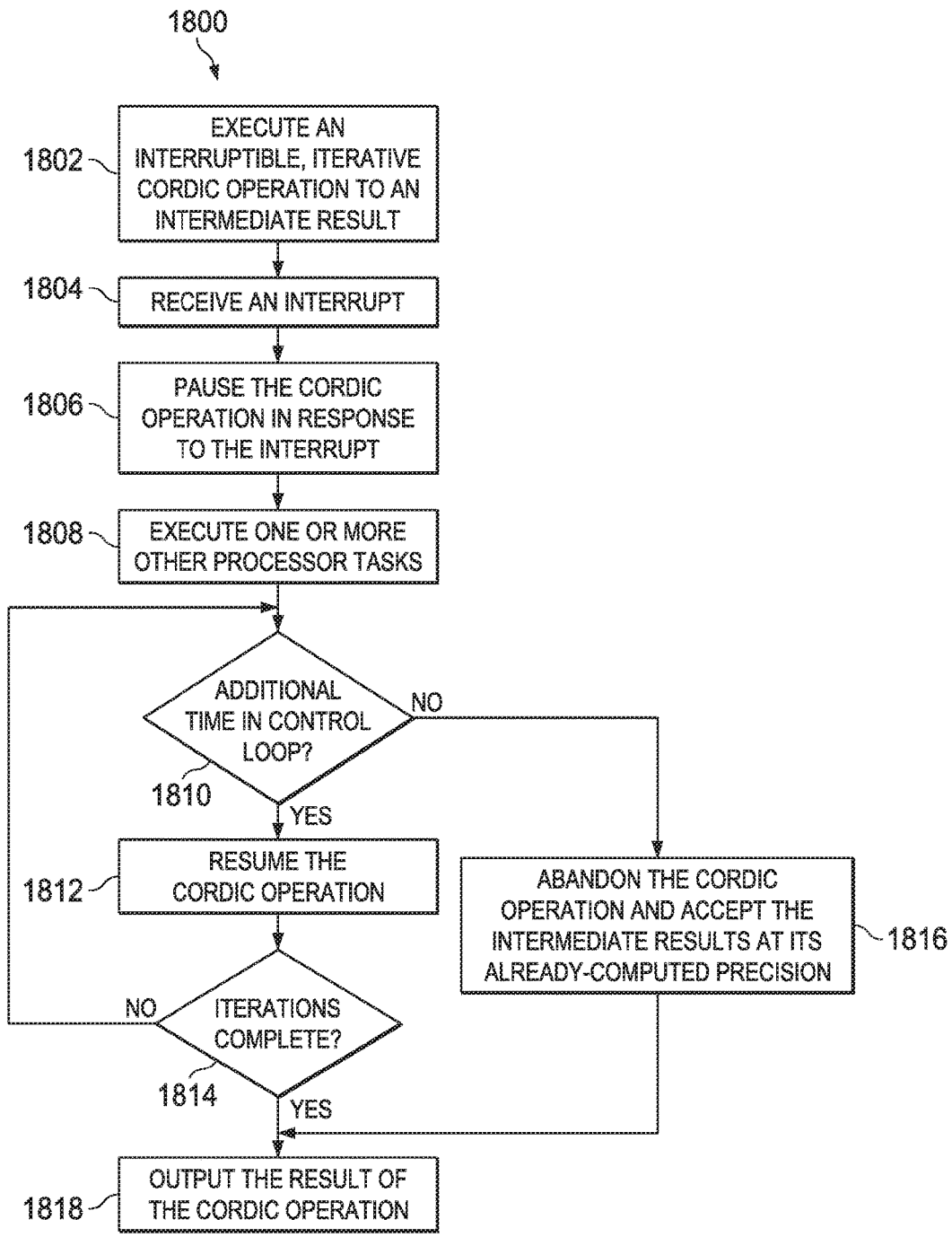

FIG. 18 is a flow diagram illustrating another example method 1800 for interruptible iterative CORDIC computation of, for example, trigonometric functions, using a digital processor, such as processor 102 in FIG. 1, having specialized hardware for performing CORDIC computations. Method 1800 begins with the execution 1802 of an interruptible iterative CORDIC operation to an intermediate result. An interrupt is received 1804, causing the CORDIC operation to pause 1806 in response to the interrupt. At this time, the intermediate result is stored. One or more other processor tasks, e.g., one or more higher-priority interrupt service routines (ISRs), can be executed 1808. When the one or more other higher-priority tasks have been completed, the CORDIC operation can be resumed 1812 based on there being additional time in a control loop 1810.

If there is not additional time in the control loop, the CORDIC operation can be abandoned and the intermediate result can be accepted 1816 at its already-computed precision by performing a result-generation phase (e.g., POSTSINEPUF64 510 or ATAN 2PUF64 610) to make a sensible output of the intermediate result. At least about four or five CORDIC iterations should have been completed for the intermediate result to be accepted 1816, and method 1800 can include an additional check (not shown) to ensure that this requirement is met. Given sufficient time in control loop 1810, when a predefined number of iterations is complete 1814, the CORDIC result can be output 1818, e.g., for use in a control system. Again, the number of iterations desired to reach a result of a required precision can be fixed at compile time. The interruptibility of the CORDIC operation and the check 1810 for additional control loop time permits the processor performing the method the flexibility to proceed with a "good-enough" CORDIC result when control loop timing demands require a new CORDIC calculation or other computations to be performed before the predefined number of iterations has completed.

Figure 19:
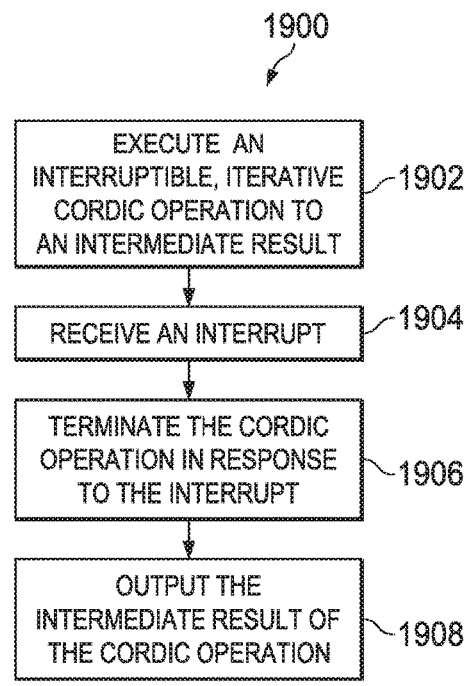

FIG. 19 is a flow diagram illustrating an example method 1900 for interruptible iterative CORDIC computation of, for example, trigonometric functions, using a digital processor, such as processor 102 in FIG. 1, having specialized hardware for performing CORDIC computations. Method 1900 begins with the execution 1902 of an interruptible iterative CORDIC operation to an intermediate result. An interrupt is received 1904, causing the CORDIC operation to terminate 1906 in response to the interrupt. The interrupt can, for example, indicate a lack of additional time in a control loop to continue the CORDIC operation. The intermediate result can be accepted and output 1908 at its already-computed precision by performing a result-generation phase (e.g., POSTSINEPUF64 510 or ATAN 2PUF64 610) to make a sensible output of the intermediate result. At least about four or five CORDIC iterations should have been completed for the intermediate result to be accepted 1908, and method 1900 can include an additional check (not shown) to ensure that this requirement is met. The interruptibility and prematureterminability of the CORDIC operation permits the processor performing the method the flexibility to switch to and complete a higher-priority processing task within the time allowed by a predefined control loop frequency.

The interruptibility of the systems and methods described herein permits CORDIC computations to be interrupted mid-precision to service higher-priority tasks. By partitioning the CORDIC computation into phases, each phase (including an iteratable phase) corresponding to an instruction call, the systems and methods herein maintain the best-case interrupt latency of processor 102. While remaining interruptible and maintaining the best-case interrupt latency of processor 102, the systems and methods described herein can provide at least a tenfold speed increase over software or machine code CORDIC implementations using conventional processor instructions. Example processors implementing the CORDIC enhancements described herein can compute sine, cosine, and a tan 2 results to within 48 bits of precision after only 28 processor cycles. By contrast, general purpose processors performing CORDIC operations implemented as software steps have been shown to achieve only 20 bits of precision for sine and cosine functions after 55 processor cycles, and only 30 bits of precision after 81 processor cycles for a tan 2 computations.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "instruction" means a processor instruction in the processor's instruction set. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An integrated circuit (IC) comprising:
   a general-purpose processing core that issues instruction calls using instructions in an instruction set; and
   special-purpose processing circuitry comprising trigonometric hardware to compute trigonometric functions using CORDIC operations, the trigonometric hardware comprising:

pre-iteration circuitry that assigns one or more input values to a quadrant and tests for exception conditions, in response to a first processor instruction call;

CORDIC circuitry that performs at least one CORDIC iteration on the one or more input values to produce result values in response to a second processor instruction call; and result generation circuitry that modifies the result values, or values based on the result values, based on one or more determinations made by the pre-iteration circuitry, in response to a third processor instruction call.

2. The IC of claim 1, wherein the special-purpose processing circuitry comprises a floating point unit (FPU) that processes instructions from the general-purpose processing core to perform computational operations on floating-point values, the FPU comprising the trigonometric hardware, multiplier hardware, adder hardware, and a bank of registers shared by the trigonometric hardware, the multiplier hardware, and the adder hardware.

3. The IC of claim 2, wherein the registers are greater in size than 32 bits each.

4. The IC of claim 1, wherein the CORDIC circuitry comprises at least one CORDIC stage, each CORDIC stage comprising:

first and second shifters that right-shift first and second coordinate values, respectively, by an iteration number;

first and second add/subtract units that increment or decrement, based on the sign of an angle value, the first and second coordinate values by the right-shifted second and right-shifted first coordinate values, respectively;

a third add/subtract unit that increments or decrements, based on the sign of the angle value, the angle value by a value retrieved from a CORDIC table, the retrieved value being based on the iteration number; and an incrementer that increments the iteration number.

5. The IC of claim 4, wherein the CORDIC table is hardwired.

6. The IC of claim 4, comprising at least two CORDIC stages coupled together, wherein the second CORDIC stage receives first and second coordinate and angle values from the first, second, and third add/subtract units of the first CORDIC stage, respectively.

7. The IC of claim 6, wherein the CORDIC circuitry produces result values from at least two CORDIC iterations in a single processor cycle.

8. The IC of claim 1, wherein the CORDIC circuitry performs the at least one CORDIC iteration in a single processor cycle.

9. The IC of claim 8, wherein the pre-iteration circuitry assigns the one or more input values to the quadrant and tests for exception conditions, and the result generation circuitry modifies the result values or values based on the result values based on the one or more determinations made by the pre-iteration circuitry, each in respective single processor cycles.

10. The IC of claim 1, wherein instructions executed by the special-purpose processing circuitry to compute trigonometric functions using CORDIC operations are interruptible with no more interrupt latency than the smallest nonzero interrupt latency associated with any instruction in the instruction set.

11. A method of computing trigonometric functions, the method comprising:

executing, with a processor, an interruptible iterative CORDIC operation to an intermediate result, wherein individual or multiple iterations of the CORDIC operation are performed using specialized hardware for computing CORDIC operations;

receiving an interrupt;

pausing the CORDIC operation in response to the interrupt; and executing one or more other processor tasks with the processor.

12. The method of claim 11, further comprising:

resuming the CORDIC operation based on determining that there is sufficient additional time in a control loop to perform one or more additional CORDIC iterations;

completing the CORDIC operation to a predetermined number of iterations; and outputting a final result of the CORDIC operation.

13. The method of claim 11, further comprising:

abandoning the CORDIC operation and accepting the intermediate result at its already-computed precision, based on determining that there is insufficient additional time in a control loop to perform one or more additional CORDIC iterations; and outputting the intermediate result of the CORDIC operation.

14. The method of claim 11, further comprising:

resuming the CORDIC operation to a new intermediate result based on determining that there is sufficient additional time in a control loop to perform one or more additional CORDIC iterations;

abandoning the CORDIC operation and accepting the new intermediate result at its already-computed precision, based on determining that there is insufficient additional time in a control loop to perform one or more additional CORDIC iterations; and outputting the new intermediate result of the CORDIC operation.

15. The method of claim 11, wherein more than one CORDIC iteration is performed each cycle of the processor.

16. The method of claim 11, wherein the interrupt indicates a need to process one or more other processor tasks of higher priority than the CORDIC operation.

17. The method of claim 11, wherein the intermediate result is higher than single-precision.

18. The method of claim 11, wherein the CORDIC operation comprises accessing CORDIC table values from a hardwired CORDIC table without accessing writable memory locations to retrieve the CORDIC table values.

19. A method of computing trigonometric functions, the method comprising:

executing, with a processor, an interruptible iterative CORDIC operation to an intermediate result, wherein individual or multiple iterations of the CORDIC operation are performed using specialized hardware for computing CORDIC operations;

receiving an interrupt;

terminating the CORDIC operation in response to the interrupt; and outputting the intermediate result of the CORDIC operation.

20. The method of claim 19, wherein more than one CORDIC iteration is performed each cycle of the processor.

21. The method of claim 20, wherein the intermediate result is higher than single-precision.

22. The method of claim 19, wherein the interrupt indicates a lack of additional time in a control loop to continue the CORDIC operation.

* * * * *